United States Patent
Fang et al.

(10) Patent No.: US 9,774,651 B2
(45) Date of Patent: Sep. 26, 2017

(54) METHOD AND APPARATUS FOR RAPID DATA DISTRIBUTION

(71) Applicant: Huawei Technologies Co., Ltd., Shenzhen (CN)

(72) Inventors: Fan Fang, Hangzhou (CN); Keping Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 14/251,712

(22) Filed: Apr. 14, 2014

(65) Prior Publication Data

US 2014/0222960 A1    Aug. 7, 2014

Related U.S. Application Data

(63) Continuation of application No. PCT/CN2011/081366, filed on Oct. 27, 2011.

(51) Int. Cl.
*G06F 15/16* (2006.01)
*H04L 29/08* (2006.01)
(Continued)

(52) U.S. Cl.
CPC ......... *H04L 67/02* (2013.01); *G06F 9/3824* (2013.01); *G06F 13/28* (2013.01); *G06F 13/385* (2013.01);
(Continued)

(58) Field of Classification Search
CPC ......... H04L 63/20; H04L 63/08; H04L 63/04; G06F 2221/0737; G06F 2221/2137; G06F 15/16
(Continued)

(56) References Cited

U.S. PATENT DOCUMENTS 5,442,797 A * 8/1995 Casavant ............ G06F 9/3877 712/13
5,924,094 A * 7/1999 Sutter ............... G06F 17/30575
(Continued)

FOREIGN PATENT DOCUMENTS

CN    1871587 A    11/2006
CN    101115054 A    1/2008
(Continued)

OTHER PUBLICATIONS

Zesheng Chen et al; Study and Realization of Interface Technique in ATM Network Adaptor; Modern Communication Technology Institute; Shanghai JiaoTong University; Shanghai 200030; Jan. 30, 2001; total 3 pages.

*Primary Examiner* — Tesfay Yohannes

(57) ABSTRACT

A method and an apparatus for rapid data distribution, the method includes: sending, by a central processing unit, data description information to a rapid forwarding module, where the data description information includes an address and length information of data requested by a user; reading, by the rapid forwarding module according to the data description information, the data requested by the user and forwarding the data requested by the user to a network interface controller; and sending, by the network interface controller, the data requested by the user to the user. By using the method provided in the present invention, after services are increased, only the network interface controller and a storage device need to be added, and cost for the memory and the central processing unit does not need to be increased.

13 Claims, 5 Drawing Sheets

(51) Int. Cl.
   *G06F 9/38*    (2006.01)
   *H04L 29/06*   (2006.01)
   *G06F 13/28*   (2006.01)
   *G06F 13/38*   (2006.01)

(52) U.S. Cl.
   CPC .......... *H04L 65/4084* (2013.01); *H04L 65/80* (2013.01); *G06F 2213/3808* (2013.01)

(58) Field of Classification Search
   USPC ................................................ 709/217, 239
   See application file for complete search history.

(56) References Cited

U.S. PATENT DOCUMENTS

| | | | | |
|---|---|---|---|---|
| 6,333,932 | B1 * | 12/2001 | Kobayasi | H04L 5/16 370/253 |
| 6,970,451 | B1 * | 11/2005 | Greenberg | H04L 45/02 370/242 |
| 7,093,026 | B2 * | 8/2006 | Kokado | H04L 12/1868 709/227 |
| 7,099,317 | B2 | 8/2006 | Ambe et al. | |
| 7,225,158 | B2 * | 5/2007 | Toshikage | G06Q 20/1235 348/E7.073 |
| 7,706,374 | B2 * | 4/2010 | Huang | H04L 29/1232 370/392 |
| 7,848,333 | B2 * | 12/2010 | Zhu | H04L 45/507 370/395.5 |
| 8,046,487 | B2 * | 10/2011 | Jagannathan | H04L 69/16 709/218 |
| 8,452,803 | B2 * | 5/2013 | Ghosh | G06Q 10/10 707/769 |
| 8,654,764 | B2 * | 2/2014 | Dietterle | H04L 12/417 370/376 |
| 8,804,490 | B2 * | 8/2014 | Tatipamula | H04L 41/12 370/218 |
| 9,215,217 | B2 * | 12/2015 | Abu-Hakima | H04L 12/1895 |
| 2001/0021949 | A1 | 9/2001 | Blightman et al. | |
| 2004/0139208 | A1 | 7/2004 | Tuli | |
| 2005/0015469 | A1 | 1/2005 | Zuberi | |
| 2005/0144223 | A1 | 6/2005 | Yang et al. | |
| 2005/0198113 | A1 | 9/2005 | Mohamed et al. | |
| 2006/0242334 | A1 | 10/2006 | Kyusojin et al. | |
| 2008/0028103 | A1 | 1/2008 | Schlansker et al. | |
| 2008/0043750 | A1 | 2/2008 | Keels et al. | |
| 2009/0049225 | A1 | 2/2009 | Kano et al. | |
| 2009/0110110 | A1 | 4/2009 | Kyusojin | |
| 2010/0020818 | A1 | 1/2010 | Cardona et al. | |
| 2010/0049902 | A1 | 2/2010 | Kakihara et al. | |
| 2010/0082849 | A1 | 4/2010 | Millet et al. | |
| 2010/0095037 | A1 | 4/2010 | Kyusojin et al. | |
| 2010/0312924 | A1 | 12/2010 | Araki | |
| 2011/0246597 | A1 | 10/2011 | Swanson et al. | |

FOREIGN PATENT DOCUMENTS

| | | |
|---|---|---|
| CN | 102171665 A | 8/2011 |
| EP | 0752801 A2 | 1/1997 |
| JP | 09128315 A | 5/1997 |
| JP | 2005044353 A | 2/2005 |
| JP | 2006293799 A | 10/2006 |
| JP | 2008172515 A | 7/2008 |
| JP | 2009048298 A | 3/2009 |
| JP | 2009118106 A | 5/2009 |
| JP | 2010049502 A | 3/2010 |
| RU | 2388039 C2 | 4/2010 |

* cited by examiner

| Memory select (Memory Select) | Package select identification (Package Select) | Package mode identification (Package ID) | Buffer address (Buffer Address) |
|---|---|---|---|
| Length (Length) | . . . | | |
FIG. 3
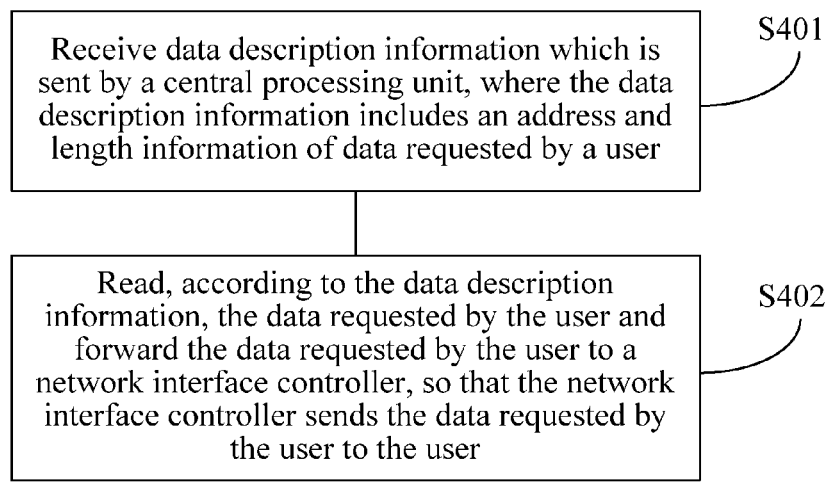
FIG. 4
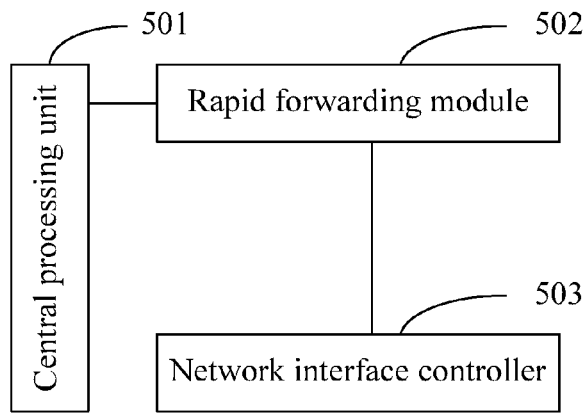
FIG. 5

METHOD AND APPARATUS FOR RAPID DATA DISTRIBUTION

CROSS-REFERENCE TO RELATED APPLICATIONS

This application is a continuation of International Application No. PCT/CN2011/081366, filed on Oct. 27, 2011, which is hereby incorporated by reference in its entirety.

TECHNICAL FIELD

The present invention relate to the field of communications, and in particular, to a method and an apparatus for rapid data distribution.

BACKGROUND

Internet applications already enter a Web 2.0 era, and selection of a service by a user is mainly based on actual user experience. In order to solve the problem where latency affects the user experience, a great number of rapid access designs are provided to achieve good user experience. Almost all Internet companies are carrying out acceleration designs, among which the design of caches in a content delivery network (CDN) is particularly highlighted. In the CDN, every cache is an intermediate device and provides a caching function.

Using a video on demand service in CDN product services as an example, an acceleration solution for the video on demand service provided in the prior art is shown in FIG. 1 (arrowed lines indicate information or data flow directions, and sequence numbers attached to the lines indicate sequential relationships): a request of a user enters from a network port, that is, a network interface controller (NIC); after receiving the request, a central processing unit (CPU) reads data from a storage device and stores the data into a memory, sends the data to the NIC, and sends the data to a client by using the NIC. In this solution, the CDN product provides a rapid flash memory and a network, and provides a cache for hotspot data. If the storage device does not have video data requested by the user for the moment, the request is sent by using the NIC to another device capable of providing the video data requested by the user, and the video data requested by the user is retrieved by using the NIC and then sent to the client; in order to satisfy the request of the user next time, when or after the video data retrieved from another device is sent to the client, the video data is stored in a local storage device.

Defects of the prior art lie in that all the video data needs to be processed by the memory and the CPU once. The CPU operates to remove and distribute the data, but cannot implement separation of a data plane and a control plane; for a CDN stream, in the case of high concurrency, CPU usage is high, which leads to an obvious bottleneck in performance.

SUMMARY

Embodiments of the present invention provide a method and an apparatus for rapid data distribution, to reduce utilization of a central processing unit and a memory, and improve system performance.

An embodiment of the present invention provides a method for rapid data distribution, including: sending, by a central processing unit, data description information to a rapid forwarding module, where the data description information includes an address and length information of data requested by a user; reading, by the rapid forwarding module according to the data description information, the data requested by the user and forwarding the data requested by the user to a network interface controller; and sending, by the network interface controller, the data requested by the user to the user.

Another embodiment of the present invention provides a method for rapid data distribution, including: receiving data description information which is sent by a central processing unit, where the data description information includes an address and length information of data requested by a user; and reading, according to the data description information, the data requested by the user and forwarding the data requested by the user to a network interface controller so that the network interface controller sends the data requested by the user to the user.

An embodiment of the present invention provides a system for rapid data distribution, which includes a central processing unit, a network interface controller, and a rapid forwarding module, where the central processing unit is configured to send data description information to the rapid forwarding module, where the data description information includes an address and length information of data requested by a user; the rapid forwarding module is configured to read, according to the data description information, the data requested by the user and forward the data requested by the user to the network interface controller; and the network interface controller is configured to send the data requested by the user to the user.

An embodiment of the present invention provides an apparatus for rapid data distribution, which includes a receiving module and a data reading module, where the receiving module is configured to receive data description information which is sent by a central processing unit, where the data description information includes an address and length information of data requested by a user; and the data reading module is configured to read, according to the data description information, the data requested by the user and forward the data requested by the user to a network interface controller so that the network interface controller sends the data requested by the user to the user.

As can be seen from the foregoing embodiments of the present invention, the network interface controller sends the address and the length information to the rapid forwarding module, the rapid forwarding module reads the data requested by the user and forwards the data requested by the user to the network interface controller, and the network interface controller sends the data requested by the user. The whole data transmission process is completed by using an independent and direct channel between the network interface controller and a storage device, and the data does not pass through the central processing unit and the memory; the central processing unit is only required to configure a transmit descriptor, and is not required to copy the data. Therefore, in comparison with the prior art, by using the method provided in the embodiments of the present invention, after services are increased (for example, existing bandwidth of a network adapter and existing storage capacity need to be expanded), only the network interface controller and the storage device need to be added, and cost for the memory and the central processing unit does not need to be increased. On the one hand, utilization of the memory and the central processing unit can be reduced, and performance of an entire system is improved; on the other hand, the possibility of the problem of a memory wall is reduced.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings.

FIG. 3 is a schematic structural diagram of a transmit descriptor according to an embodiment of the present invention;

FIG. 4 is a schematic flowchart of a method for rapid data distribution according to an embodiment of the present invention;

FIG. 5 is a schematic structural diagram of a system for rapid data distribution according to an embodiment of the present invention;

DESCRIPTION OF EMBODIMENTS

Embodiments of the present invention provide a method and an apparatus for rapid data distribution, to reduce utilization of a central processing unit and a memory, and improve system performance.

Figure 1:
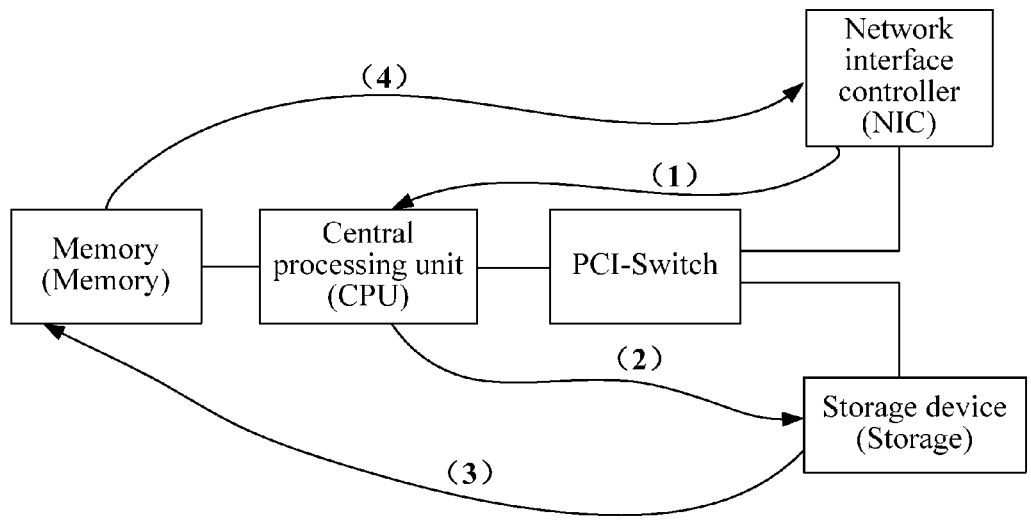
FIG. 1 is a schematic diagram of an acceleration solution for a video on demand service in the prior art.
Figure 2:
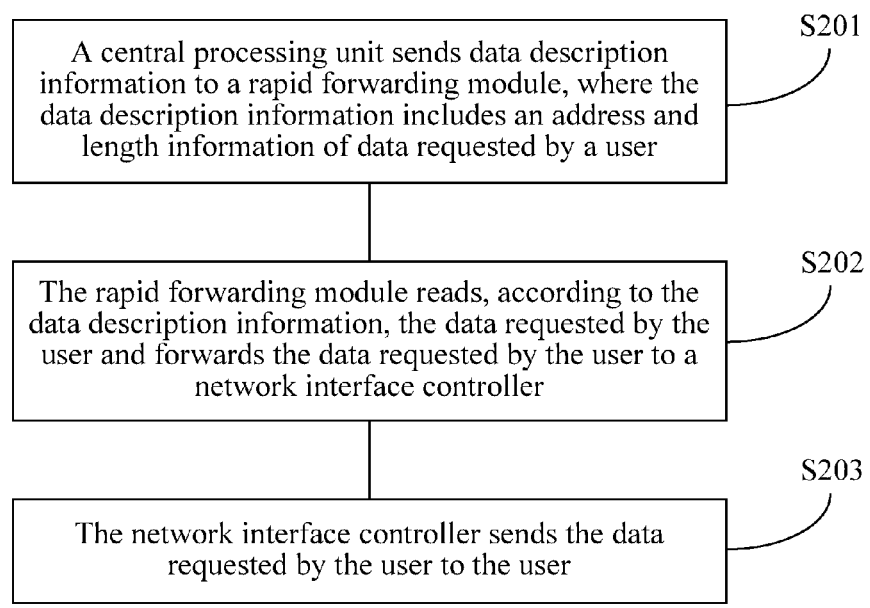
FIG. 2 is a schematic flowchart of a method for rapid data distribution according to an embodiment of the present invention.

FIG. 2 is a schematic flowchart of a method for rapid data distribution according to an embodiment of the present invention, which mainly includes the following steps:

S201: A central processing unit sends data description information to a rapid forwarding module, where the data description information includes an address and length information of data requested by a user.

In the embodiment provided by the present invention, the rapid forwarding module is a functional module which is embedded in a PCI-Switch or embedded in a network interface controller (NIC), and provides direct sending and receiving functions. After being configured by the CPU, the functional module may read data in a storage device or a memory, and send the data to the NIC, to complete direct memory access (DMA) and data sending, that is, the rapid forwarding module reads, in a DMA manner, the data requested by the user and forwards the data requested by the user to the network interface controller.

Generally, the NIC has corresponding data description information in the memory. When the central processing unit needs to send data, the central processing unit configures the data description information, for example, a transmit descriptor. At this time, the NIC obtains the transmit descriptor of the data to be sent, and notifies an internal DMA module of reading, according to a buffer address field and a length field in the transmit descriptor, data from a corresponding address, and sends the data. For each piece of data to be sent, a transmit descriptor needs to be configured, and data is sent after its transmit descriptor is configured.

If the data to be sent is data that is continuously stored or a specific stream of data that can be predicted by the central processing unit, the central processing unit configures the rapid forwarding module, and the NIC directly sends the data to the storage device so that the storage device stores the data; or the data may be directly sent from the storage device to the NIC, so as to complete DMA operations from the NIC to the storage device and from the storage device to the NIC, without occupying bandwidth between the PCI-Switch and the central processing unit.

Therefore, in the embodiment of the present invention, the transmission of the data does not require intervention of the central processing unit; the central processing unit is only required to configure the data description information, and is not required to copy the data, thereby preventing consumption of a memory resource due to data copying.

When a link is established for a user, a package mode identification (Package ID) is assigned to the user, and the package mode identification is delivered to the rapid forwarding module according to a packet format in a response of the user. In the embodiment of the present invention, the Package ID is corresponding to a package mode, and is placed in a package list of the rapid forwarding module. The list item is mainly a definition of a packet format, that is, content of an Internet Protocol (IP) header format. When data is subsequently read from the storage device, the data is packaged according to the defined format, and the data can be directly sent and used.

When a user requests data, the central processing unit receives, by using the NIC, a request sent by the user, and the request carry information such as an address and length of the data requested by the user. The central processing unit sends the information such as the address and the length of the data requested by the user to the NIC, so as to trigger the DMA module of the NIC to read the data requested by the user.

As an embodiment of the present invention, the central processing unit may configure the data description information, for example, a transmit descriptor, and carry the address and the length information of the data requested by the user in the data description information; besides, when configuring the data description information, the central processing unit may also carry a package mode identification and a package select identification in the data description information, where the package mode identification is corresponding to the user requesting the data, and the package select identification is used for identifying whether the data requested by the user needs to be packaged. The central processing unit sends the data description information to the network interface controller, and the network interface controller forwards the data description information to the rapid forwarding module.

A format of the transmit descriptor provided in the embodiment of the present invention is shown in FIG. 3, where a memory select identification field indicates whether stored data is to be read from a memory or a storage device, and may be indicated by one binary bit, for example, if the field is "1", it indicates that the stored data is to be read from the memory, and if the field is "0", it indicates that the stored data is to be read from the storage device; or on the contrary, if the field is "0", it indicates that the stored data is to be read from the memory, and if the field is "1", it indicates that the stored data is to be read from the storage device (Storage); a package select identification field indicates whether a rapid forwarding module needs to package or encapsulate the read data; a package mode identification (Package ID) field indicates which package or encapsulation mode is to be used, where the field is also corresponding to a user requesting the data; a buffer address field indicates an address of the data requested by the user, where the address of the data requested by the user is provided by a request which is sent by the user while requesting the data; a length field indicates the length of the data requested by the user; and the transmit descriptor further includes other control fields, which are not described herein.

S202: The rapid forwarding module reads, according to the data description information, the data requested by the user and forwards the data requested by the user to the network interface controller.

The rapid forwarding module reads, according to the data description information (for example, the transmit descriptor) such as the buffer address, the length information, the package select identification, and a memory select identification of the data requested by the user, the data requested by the user, where the data requested by the user is transmitted by the DMA module of the network interface controller.

Specifically, the rapid forwarding module may read, according to the information, such as the buffer address and the length information included in the data description information, the data requested by the user, and further determine, according to the package select identification field in the transmit descriptor, whether the data requested by the user needs to be packaged; and if the data requested by the user needs to be packaged, package the data requested by the user and forward the packaged data to the network interface controller. For example, the rapid forwarding module may package, according to a package mode corresponding to the package mode identification in the transmit descriptor, the data requested by the user and forward the packaged data to the network interface controller.

For another example, the rapid forwarding module may also determine, according to the memory select identification, whether the data requested by the user is to be read from a memory or the data requested by the user is to be read from a storage device; and if it is determined that the data requested by the user is to be read from the storage device, read the data requested by the user from the storage device and forward the data requested by the user to the network interface controller; otherwise, read the data requested by the user from the memory and forward the data requested by the user to the network interface controller.

S203: The network interface controller sends the data requested by the user to the user.

As can be seen from the foregoing embodiment of the present invention, the central processing unit sends the address and the length information to the rapid forwarding module, the rapid forwarding module reads the data requested by the user and forwards the data requested by the user to the network interface controller, and the network interface controller sends the data requested by the user. The whole data transmission process is completed by using an independent and direct channel between the network interface controller and the storage device, and the data does not pass through the central processing unit and the memory; the central processing unit is only required to configure the data description information, and is not required to copy the data. Therefore, in comparison with the prior art, by using the method provided in the embodiment of the present invention, after services are increased (for example, existing bandwidth of a network adapter and existing storage capacity need to be expanded), only devices including the network interface controller and the storage device need to be added, and cost for the memory and the central processing unit does not need to be increased. On the one hand, utilization of the memory and the central processing unit can be reduced, and performance of an entire system is improved; on the other hand, the problem of a memory wall is avoided.

FIG. 4 is a schematic flowchart of a method for rapid data distribution according to an embodiment of the present invention. This embodiment may be executed by the rapid forwarding module in the method for rapid data distribution exemplified in FIG. 2. As shown in FIG. 4, the method mainly includes the following steps:

S401: Receive data description information which is sent by a central processing unit, where the data description information includes an address and length information of data requested by a user.

When a user requests data, the central processing unit receives, by using a network interface controller (NIC), a request sent by the user, and these requests carry information such as an address and length of the data requested by the user. The central processing unit sends the information such as the address and the length of the data requested by the user to the NIC, so as to trigger a DMA module of the NIC to read the data requested by the user.

As an embodiment of the present invention, the central processing unit may configure the data description information, for example, a transmit descriptor, and carry the address and the length information of the data requested by the user in the data description information; besides, when configuring the data description information, the central processing unit may also carry a package mode identification and a package select identification in the data description information, where the package mode identification is corresponding to the user requesting the data, and the package select identification is used for identifying whether the data requested by the user needs to be packaged. A specific format of the transmit descriptor is shown in FIG. 3, and for a specific meaning thereof, reference may be made to the related textual description in the foregoing embodiment.

The central processing unit sends the data description information to the network interface controller, and the rapid forwarding module receives the data description information forwarded by the network interface controller.

S402: Read, according to the data description information, the data requested by the user and forward the data requested by the user to the network interface controller so that the network interface controller sends the data requested by the user to the user.

The rapid forwarding module reads, according to the data description information (for example, the transmit descriptor) such as a buffer address, the length information, the package select identification, and a memory select identification of the data requested by the user, the data requested by the user, where the data requested by the user is transmitted by the DMA module of the network interface controller.

Specifically, the rapid forwarding module may read, according to the data description information such as the buffer address and the length information, the data requested by the user, and further determine, according to the package select identification field in the transmit descriptor, whether the data requested by the user needs to be packaged; and if the data requested by the user needs to be packaged, package the data requested by the user and forward the packaged data to the network interface controller. For example, the rapid forwarding module may package, according to a package mode corresponding to the package mode identification in the transmit descriptor, the data requested by the user and forward the packaged data to the network interface controller.

For another example, the rapid forwarding module may also determine, according to the memory select identification, whether the data requested by the user is to be read from a memory or the data requested by the user is to be read from a storage device; and if it is determined that the data requested by the user is to be read from the storage device, read the data requested by the user from the storage device and forward the data requested by the user to the network interface controller; otherwise, read the data requested by the user from the memory and forward the data requested by the user to the network interface controller.

It should be noted that the rapid forwarding module in this embodiment is a functional module which is embedded in a PCI-Switch or embedded in the NIC, and provides direct sending and receiving functions. After being configured by the central processing unit, the functional module may read data in the storage device or the memory, and send the data to the NIC to complete direct memory access (DMA) and data sending, that is, the rapid forwarding module reads, in a DMA manner, the data requested by the user and forwards the data requested by the user to the network interface controller.

FIG. 5 is a schematic structural diagram of a system for rapid data distribution according to an embodiment of the present invention. For ease of description, only parts which are related to the embodiment of the present invention are shown, and functional modules/units included in the parts may be software modules/units, hardware modules/units, or modules/units integrating software and hardware (this description principle is applicable to each embodiment provided in this specification). The system for rapid data distribution exemplified in FIG. 5 includes a central processing unit 501, a rapid forwarding module 502, and a network interface controller 503, where the central processing unit 501 is configured to send data description information to the rapid forwarding module 502, where the data description information includes an address and length information of data requested by a user; the rapid forwarding module 502 is configured to read, according to the data description information, the data requested by the user and forward the data requested by the user to the network interface controller 503; and the network interface controller 503 is configured to send the data requested by the user to the user. When a link is established for a user, a package mode identification is assigned to the user, and the package mode identification is delivered to the rapid forwarding module according to a packet format in a response of the user. In the embodiment of the present invention, the Package ID is corresponding to a package mode, and is placed in a package list of the rapid forwarding module. The list item is mainly a definition of a packet format, that is, content of an IP header format. When data is subsequently read from a storage device, the data is packaged according to the defined format, and the data can be directly sent and used.

When a user requests data, the central processing unit 501 receives, by using the network interface controller 503, a request sent by the user, and these requests carry information such as an address and length of the data requested by the user. The central processing unit 501 sends the information such as the address and the length of the data requested by the user to the network interface controller 503, so as to trigger a DMA module of the network interface controller 503 to read the data requested by the user.

Figure 6:
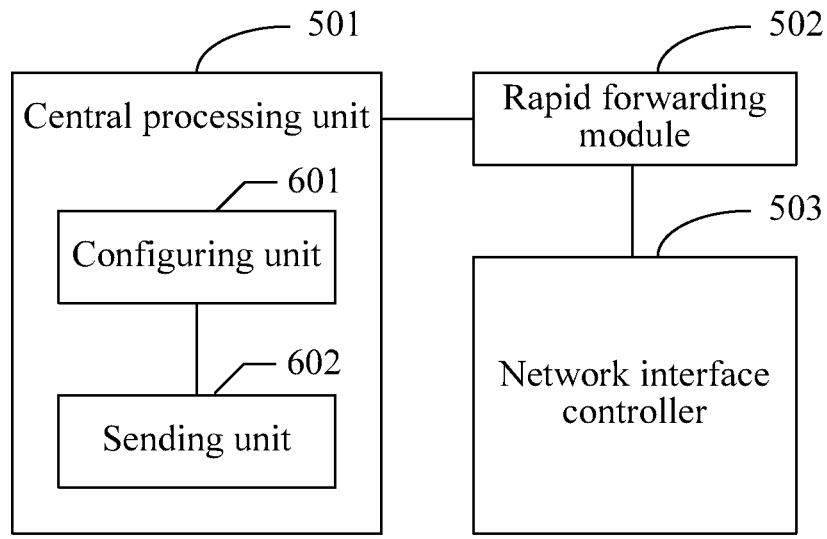
FIG. 6 is a schematic structural diagram of a system for rapid data distribution according to another embodiment of the present invention.

FIG. 6 shows a system for rapid data distribution according to another embodiment of the present invention, where the central processing unit 501 may include a configuring unit 601 and a sending unit 602, where the configuring unit 601 is configured to configure the data description information, for example, a transmit descriptor, and as shown in FIG. 3, carry the address and the length information of the data requested by the user in the data description information; besides, when configuring the data description information, the configuring unit 601 may also carry a package mode identification, a package select identification, and a memory select identification in the data description information, where the package mode identification is corresponding to the user requesting the data, the package select identification is used for identifying whether the data requested by the user needs to be packaged, and the memory select identification is used for identifying whether the stored data is to be read from a memory or a storage device; and the sending unit 602 is configured to send the data description information to a network interface controller 503 so that the network interface controller 503 forwards the data description information to a rapid forwarding module 502.

In the embodiment provided by the present invention, the rapid forwarding module 502 is a functional module which is embedded in a PCI-Switch or embedded in the network interface controller 503, and provides direct sending and receiving functions. After being configured by a central processing unit 501, the functional module may read data in the storage device or the memory, and send the data to the network interface controller (NIC), to complete DMA and data sending, that is, the rapid forwarding module 502 reads, in a DMA manner, the data requested by the user and forwards the data requested by the user to the network interface controller.

Generally, the network interface controller 503 has a corresponding transmit descriptor linked list in the memory. When the central processing unit 501 needs to send data, the central processing unit 501 configures a transmit descriptor. At this time, the network interface controller 503 obtains the data to be sent, and notifies an internal DMA module of reading, according to a buffer address field and a length field in the transmit descriptor, data from a corresponding address, and sending the data. For each piece of data to be sent, a transmit descriptor needs to be configured, and each time a transmit descriptor is configured, a piece of data is sent.

If the data to be sent is a piece of continuous data or a fixed stream of data that can be predicted by the central processing unit 501, the central processing unit 501 configures the rapid forwarding module, and the network interface controller 503 directly sends the data to the storage device so that the storage device stores the data; or the data may be directly sent from the storage device to the network interface controller 503, so as to complete DMA operations from the network interface controller 503 to the storage device and from the storage device to the network interface controller 503, without occupying bandwidth between the PCI-Switch and the central processing unit.

Therefore, in the embodiment of the present invention, the transmission of the data does not require intervention of the central processing unit; the central processing unit is only required to configure the data description information, and is not required to copy the data because data copying leads to consumption of a memory resource.

Figure 7:
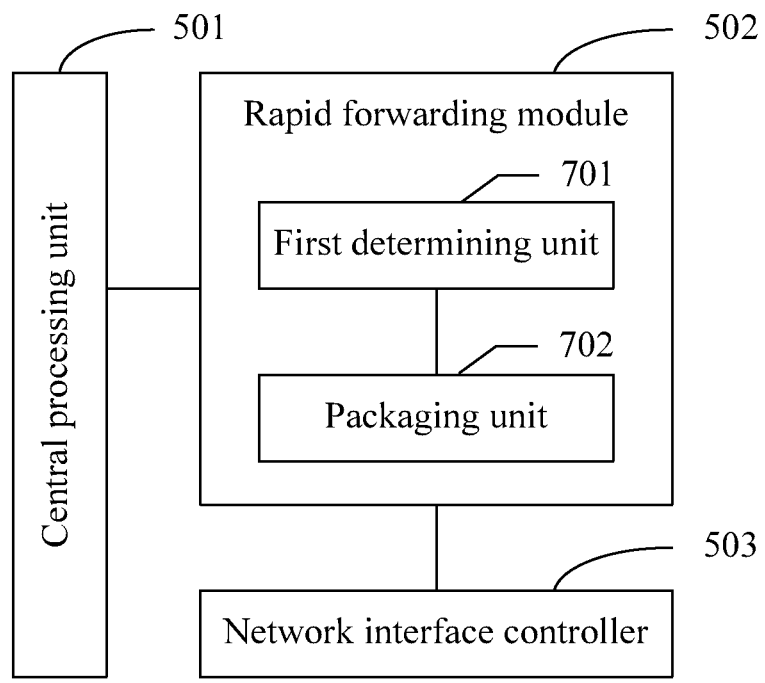
FIG. 7 is a schematic structural diagram of a system for rapid data distribution according to another embodiment of the present invention.

FIG. 7 shows a system for rapid data distribution according to another embodiment of the present invention, where the rapid forwarding module 502 may include a first determining unit 701 and a packaging unit 702, where the first determining unit 701 is configured to read, according to the data description information, the data requested by the user, and determine, according to the package select identification, whether the data requested by the user needs to be packaged; and the packaging unit 702 is configured to, if a determination result of the first determining unit 701 is that the data requested by the user needs to be packaged, package the data requested by the user and forward the packaged data to the network interface controller 503.

Figure 8:
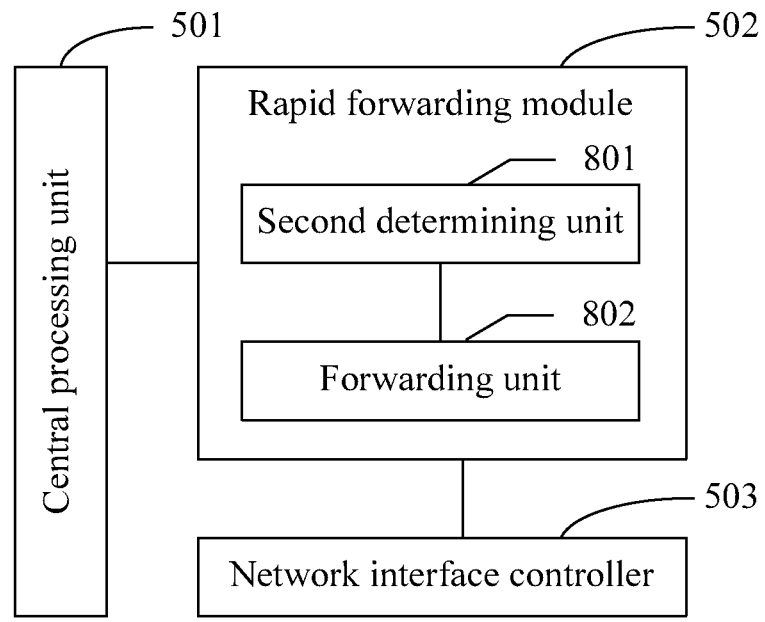
FIG. 8 is a schematic structural diagram of a system for rapid data distribution according to another embodiment of the present invention.

FIG. 8 shows a system for rapid data distribution according to another embodiment of the present invention, where the rapid forwarding module 502 may include a second determining unit 801 and a forwarding unit 802, where the second determining unit 801 is configured to determine, according to the memory select identification, whether the data requested by the user is to be read from the memory or the data requested by the user is to be read from the storage device; and the forwarding unit 802 is configured to, if a determination result of the second determining unit 801 is that the data requested by the user is to be read from the storage device, read the data requested by the user from the storage device and forward the data requested by the user to the network interface controller 503; otherwise, read the data requested by the user from the memory and forward the data requested by the user to the network interface controller 503.

Figure 9:
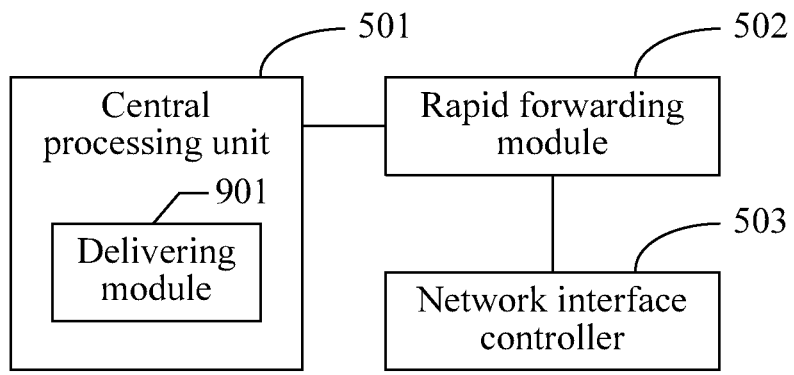
FIG. 9 is a schematic structural diagram of a system for rapid data distribution according to another embodiment of the present invention.

The central processing unit 501 exemplified in any one of FIG. 5 to FIG. 8 further includes a delivering module 901 shown in FIG. 9. The delivering module 901 is configured to deliver the package mode identification to the rapid forwarding module 502, where the package mode identification is corresponding to a package mode.

Figure 10:
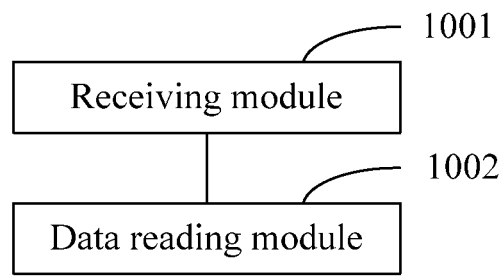
FIG. 10 is a schematic structural diagram of an apparatus for rapid data distribution according to an embodiment of the present invention.

FIG. 10 is a schematic structural diagram of an apparatus for rapid data distribution according to an embodiment of the present invention. For ease of description, only parts which are related to the embodiment of the present invention are shown, and functional modules/units included in the parts may be software modules/units, hardware modules/units, or modules/units integrating software and hardware (this description principle is applicable to each embodiment provided in this specification). The apparatus for rapid data distribution exemplified in FIG. 10 may be the rapid forwarding module 502 exemplified in any one of FIG. 5 to FIG. 9, and includes a receiving module 1001 and a data reading module 1002, where the receiving module 1001 is configured to receive data description information which is sent by a central processing unit, where the data description information may be the transmit descriptor exemplified in FIG. 3, and includes an address and length information of data requested by a user; and the data reading module 1002 is configured to read, according to the data description information, the data requested by the user and forward the data requested by the user to a network interface controller so that the network interface controller sends the data requested by the user to the user. Specifically, the data reading module 1002 is configured to read, in a direct memory access manner according to the data description information, the data requested by the user and forward the data requested by the user to the network interface controller.

Therefore, in this embodiment, the transmission of the data does not require intervention of the central processing unit; the central processing unit is only required to configure the data description information, and is not required to copy the data because data copying leads to consumption of a memory resource.

It should be noted that in the foregoing implementation manner of the apparatus for rapid data distribution, the division of the functional modules is only exemplary, and in an actual application, the foregoing functions may be assigned to different functional modules for implementation according to requirements, for example, configuration requirements of related hardware or convenience for implementation of software; that is, the inner structure of the apparatus for rapid data distribution is divided into different functional modules, so as to complete all or a part of the functions in the foregoing description. Besides, in an actual application, the corresponding functional modules in this embodiment may be implemented by corresponding hardware, and may also be completed by corresponding hardware executing corresponding software, for example, the foregoing receiving module may be hardware executing the receiving of the data description information sent by the central processing unit, for example, a receiver, and may also be a common processor capable of executing a corresponding computer program and thereby completing the foregoing functions, or another hardware device (the foregoing description principle is applicable to each embodiment provided in this specification).

Figure 11:
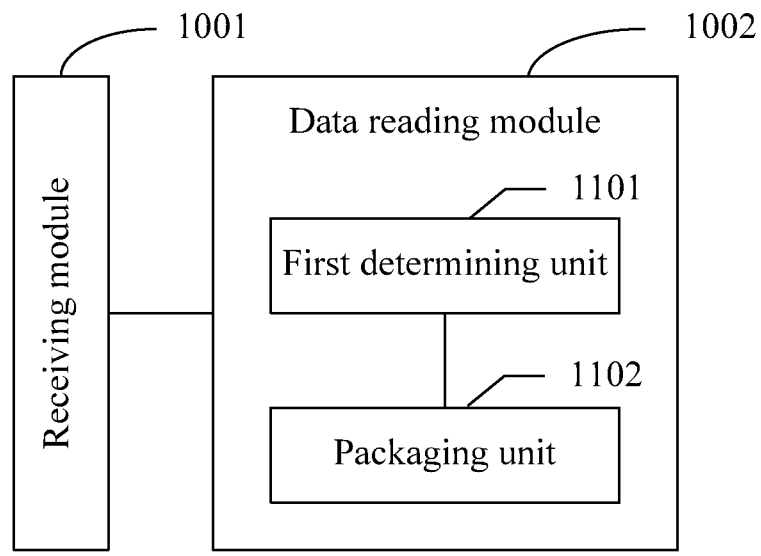
FIG. 11 is a schematic structural diagram of an apparatus for rapid data distribution according to another embodiment of the present invention.

Further, the data description information may further include a package mode identification and a package select identification, where the package mode identification is corresponding to the user requesting the data, and the package select identification is used for identifying whether the data requested by the user needs to be packaged. The data reading module 1002 exemplified in FIG. 10 may include a first determining unit 1101 and a packaging unit 1102, as shown in FIG. 11 which shows an apparatus for rapid data distribution according to another embodiment of the present invention, where the first determining unit 1101 is configured to read, according to the data description information, the data requested by the user, and determine, according to the package select identification, whether the data requested by the user needs to be packaged; and the packaging unit 1102 is configured to, if a determination result of the first determining unit 1101 is that the data requested by the user needs to be packaged, package the data requested by the user and forward the packaged data to the network interface controller.

Figure 12:
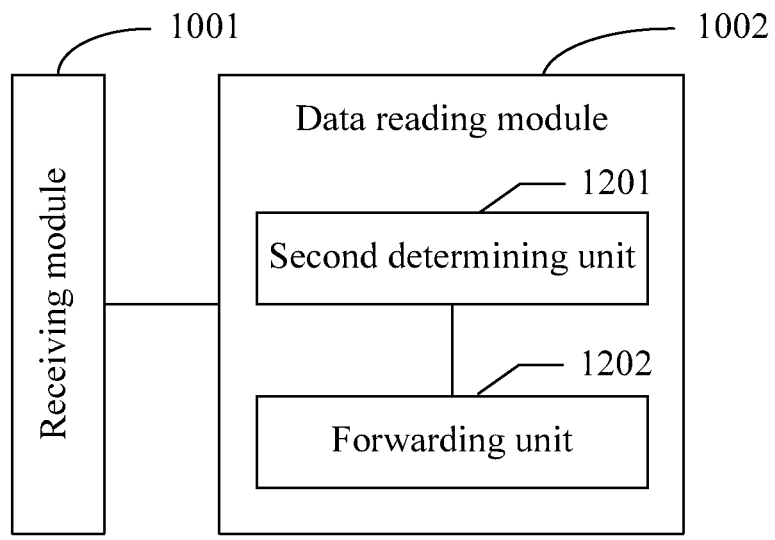
FIG. 12 is a schematic structural diagram of an apparatus for rapid data distribution according to another embodiment of the present invention.

Further, the data description information may further include a memory select identification, where the memory select identification is used for identifying whether the data requested by the user is to be read from a memory or the data requested by the user is to be read from a storage device. The data reading module 1002 exemplified in FIG. 10 may include a second determining unit 1201 and a forwarding unit 1202, as shown in FIG. 12 which shows an apparatus for rapid data distribution according to another embodiment of the present invention, where the second determining unit 1201 is configured to determine, according to the memory select identification, whether the data requested by the user is to be read from the memory or the data requested by the user is to be read from the storage device; and the forwarding unit 1202 is configured to, if a determination result of the second determining unit 1201 is that the data requested by the user is to be read from the storage device, read the data requested by the user from the storage device and forward the data requested by the user to the network interface controller; otherwise, read the data requested by the user from the memory and forward the data requested by the user to the network interface controller.

It should be noted that content such as information exchange between the modules/units of the apparatus and the execution processes thereof is based on the same idea as the method embodiments of the present invention, and produces the same technical effects as the method embodiments of the present invention. For the specific content, reference may be made to the description in the method embodiments of the present invention, and the details will not be repeated herein.

A person of ordinary skill in the art may understand that all or a part of steps of the methods in the foregoing embodiments may be completed by a program instructing relevant hardware, for example, by using one or more or all of the following methods:

Method 1: sending, by a central processing unit, data description information to a rapid forwarding module, where the data description information includes an address and length information of data requested by a user; reading, by the rapid forwarding module according to the data description information, the data requested by the user and forwarding the data requested by the user to a network interface controller; and sending, by the network interface controller, the data requested by the user to the user.

Method 2: receiving data description information which is sent by a central processing unit, where the data description information includes an address and length information of data requested by a user; and reading, according to the data description information, the data requested by the user and forwarding the data requested by the user to a network interface controller so that the network interface controller sends the data requested by the user to the user.

The program may be stored in a computer readable storage medium. The storage medium may include a read only memory (ROM), a random access memory (RAM), a magnetic disk, an optical disc, or the like.

The method, apparatus, and system for rapid data distribution provided in the embodiments of the present invention are described in detail above. In this specification, specific examples are used to describe the principle and implementation manners of the present invention, and the description of the embodiments is only intended to make the method and core idea of the present invention more comprehensible. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for data distribution, comprising:
    establishing a link between a user device and a data distribution system that comprises a central processing unit, a memory, a storage, a network interface controller and a forwarding module operably disposed external to the central processing unit which, when configured by the central processing unit, is capable of directly accessing the memory and the storage; wherein a package mode identification is assigned to the user device when the link is established, and the package mode identification is delivered to the forwarding module; wherein the package mode identification indicates a package or encapsulation mode for packaging data requested by the user device;
    receiving a request from the user device for data stored in the storage;
    configuring, by the central processing unit, data description information in the memory, wherein the data description information comprises an address and length information of the data requested by the user device;
    reading, by the forwarding module according to the data description information, the data from the storage;
    forwarding, by the forwarding module, the data to a network interface controller;
    sending, by the network interface controller, the data to the user device; and
    wherein the central processing unit, the storage and the network interface controller are interconnected through a switch, and wherein the forwarding module is a software or logic based module operably disposed in or executed by the switch.

2. The method according to claim 1, wherein the method further comprises:
    sending, by the central processing unit, the data description information to the forwarding module.

3. The method according to claim 1, wherein the data description information further comprises a package select identification, wherein the package select identification indicates whether the data needs to be packaged, and wherein the method further comprises:
    packaging the data based on the determination that the data needs to be packaged.

4. The method according to claim 3, wherein the data description information further comprises the package mode identification, wherein packaging the data comprises:
    packaging, by the forwarding module according to a package mode corresponding to the package mode identification, the data.

5. The method according to claim 1, wherein reading the data comprises accessing the storage directly according to the data description information, to retrieve the data.

6. A method for data distribution, comprising:
    receiving, by a forwarding module, data description information that is configured by a central processing unit, wherein the data description information comprises an address and length information of data requested by a user device wherein the data description information further comprises a package mode identification which is assigned to the user device when a link is established for the user device, and wherein the package mode identification indicates a package or encapsulation mode for packaging the data;
    reading, by the forwarding module according to the data description information, the data requested by the user device from a storage;
    forwarding, by the forwarding module, the data to a network interface controller; wherein the forwarding module is operably disposed external to the central processing unit which, when configured by the central processing unit, is capable of directly accessing the storage; wherein the central processing unit, the storage and the network interface controller are interconnected through a switch, and wherein the forwarding module is a software or logic based module operably disposed in or executed by the switch.

7. The method according to claim 6, wherein the data description information further comprises a package select identification, wherein the package select identification indicates whether the data needs to be packaged, and wherein the method further comprises:
packaging the data based on the determination that the data needs to be packaged.

8. The method according to claim 7, wherein the data description information further comprises the package mode identification, and wherein packaging the data comprises:
packaging, according to a package mode corresponding to the package mode identification, the data.

9. The method according to claim 8, wherein reading the data comprises:
accessing the storage directly according to the data description information, to retrieve the data.

10. A system for rapid data distribution, comprising:
a central processing unit,
a memory,
a storage,
an network interface controller, and
a forwarding module operably disposed external to the central processing unit which, when configured by the central processing unit, is capable of directly accessing the memory and the storage; wherein a package mode identification is assigned to a user device when a link is established between the user device and the data distribution system, and the package mode identification is delivered to the forwarding module; wherein the package mode identification indicates a package or encapsulation mode for packaging data requested by the user device, wherein the central processing unit, the storage and the network interface controller are interconnected through a switch;
wherein the central processing unit configures data description information comprising an address and length information of the data requested by a user device;
wherein the forwarding module is configured to read, according to the data description information in the memory, the data from the storage and forward the data to the network interface controller;
wherein the network interface controller is configured to send the data to the user device; and
wherein the forwarding module is a software or logic based module operably disposed in or executed by the switch.

11. The system according to claim 10, wherein the data description information further comprises a package select identification, wherein the package select identification indicates whether the data needs to be packaged, wherein the forwarding module is further configured to:
package the data based on the determination that the data needs to be packaged.

12. The system according to claim 11, wherein the data description information further comprises the package mode identification, and the forwarding module is configured to package, according to a package mode corresponding to the package mode identification, the data requested by the user device.

13. The system according to claim 10, wherein the forwarding module is configured to:
accessing the storage directly according to the data description information, to retrieve the data.

* * * * *